United States Patent
Nagashima

(10) Patent No.: US 6,544,915 B2
(45) Date of Patent: Apr. 8, 2003

(54) INFRARED AND ULTRAVIOLET RADIATION ABSORBING GLASS

(75) Inventor: Yukihito Nagashima, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/914,927

(22) PCT Filed: Dec. 27, 2000

(86) PCT No.: PCT/JP00/09337

§ 371 (c)(1), (2), (4) Date: Sep. 6, 2001

(87) PCT Pub. No.: WO01/49622

PCT Pub. Date: Jul. 12, 2001

(65) Prior Publication Data

US 2003/0050174 A1 Mar. 13, 2003

(30) Foreign Application Priority Data

Jan. 7, 2000 (JP) ......... 2000-001473

(51) Int. Cl.⁷ .......... C03C 3/087; C03C 3/095
(52) U.S. Cl. .......... 501/64; 501/71
(58) Field of Search ............. 501/64, 70, 71

(56) References Cited

U.S. PATENT DOCUMENTS

| | | | | |
|---|---|---|---|---|
| 5,830,812 A | * | 11/1998 | Shelestak et al. | 501/70 |
| 5,858,896 A | * | 1/1999 | Nagashima et al. | 501/64 |
| 5,908,702 A | * | 6/1999 | Mita et al. | 428/426 |
| 6,017,836 A | * | 1/2000 | Nagashima et al. | 501/64 |

FOREIGN PATENT DOCUMENTS

| | | | |
|---|---|---|---|
| EP | 0 561 337 A1 | 9/1993 | C03C/3/095 |
| EP | 0 565 882 A1 | 10/1993 | C03C/3/087 |
| EP | 0 834 481 A1 | 4/1998 | C03C/3/095 |
| GB | 2 274 841 A | 8/1994 | C03C/4/08 |
| JP | 04310539 A | * 11/1992 | |
| JP | 10072239 A | * 3/1998 | |
| JP | 10152342 A | * 6/1998 | |

* cited by examiner

*Primary Examiner*—David Sample
(74) *Attorney, Agent, or Firm*—Sughrue Mion, PLLC

(57) ABSTRACT

An infrared and ultraviolet radiation absorbing glass having a green tint, more particularly, an infrared and ultraviolet radiation absorbing glass having high transmission and pale bluish green tint which is suitable for use as a glass for automobiles or a glass for construction.

The infrared and ultraviolet radiation absorbing glass comprises, in % by weight:
   a soda-lime-silica basic glass, and
   coloring components comprising
      0.40 to less than 0.58% total iron oxide (T—$Fe_2O_3$) in terms of $Fe_2O_3$,
      0.05 to less than 0.5% $CeO_2$,
      0 to 0.5% $TiO_2$, and
      0.0001 to 0.002% CoO,
wherein 20 to less than 30% of T—$Fe_2O_3$ is FeO in terms of $Fe_2O_3$.

12 Claims, No Drawings

INFRARED AND ULTRAVIOLET RADIATION ABSORBING GLASS

TECHNICAL FIELD

The present invention relates to an infrared and ultraviolet radiation absorbing glass having a green tint. More particularly, it relates to an infrared and ultraviolet radiation absorbing glass having high transmission and pale bluish green tint which is suitable for use as a glass for automobiles or a glass for construction.

BACKGROUND ART

In recent years, interior trim of automobiles tends to be luxury, and from the standpoint of the demand to protect the interior trim from deterioration and reduce load of air conditioning, a green-tined glass having infrared and ultraviolet radiation absorbing power imparted thereto has been proposed as window glass of automobiles.

For example, JP-A-4-310539 (the term "JP-A" used herein means an "unexamined published Japanese patent application") discloses an infrared and ultraviolet radiation absorbing glass consisting essentially of, in % by weight, 65–75% $SiO_2$, 0.1–5% $Al_2O_3$, 10–18% $Na_2O$, 0–5% $K_2O$, 5–15% CaO, 1–6% MgO and 0.05–1.0% $SO_3$, and having incorporated therein as coloring components, 0.5–1.2% total iron oxide in terms of $Fe_2O_3$, 0.1–3.0% $CeO_2$ and 0–1.0% $TiO_2$, wherein 20–40% of the total iron oxide in terms of $Fe_2O_3$ is FeO.

JP-A-5-78147 discloses an infrared and ultraviolet radiation absorbing glass as a glass having relatively pale green tint in various infrared and ultraviolet radiation absorbing glasses. This glass comprises, in % by weight, basic components comprising 68–72% $SiO_2$, 1.6–3.0 $Al_2O_3$, 8.5–11.0% CaO, 2.0–4.2% MgO, 12.0–16.0% $Na_2O$, 0.5–3.0% $K_2O$ and 0.5–3.0% $SO_3$, and coloring components comprising 0.58–0.65% total iron oxide in terms of $Fe_2O_3$, 0.1–0.5% $CeO_2$, 0.1–0.4% $TiO_2$ and 10–350 ppm MnO as a trace oxide.

JP-A-6-56466 discloses a glass having low total solar energy transmission and ultraviolet transmission. This glass comprises, in % by weight, a soda-lime-silica basic glass, and having incorporated therein 0.53–0.70% total iron oxide in terms of $Fe_2O_3$, 0.35–0.50% $Fe_2O_3$, 0.16–0.24% FeO, 0.2–0.4% $TiO_2$, and 0.5–0.8% total cerium in terms of $CeO_2$, wherein an amount of FeO in terms of $Fe_2O_3$ is 30–40% based on the weight of the total iron oxide in terms of $Fe_2O_3$.

In the infrared and ultraviolet radiation absorbing glass disclosed in the above-described JP-A-4-310539, the coloring components are preferably 0.7–1.0% total iron oxide in terms of $Fe_2O_3$, and 0.3–2.0 $CeO_2$, and a visible light transmission when the glass has a thickness of 5 mm is 66.1–66.8% as shown in the examples. As is understood from this, a green tint of the glass is comparatively dark. However, in some cases such a dark tint may not be preferred as a glass for automobiles, or is not generally preferred as a glass for construction.

In the infrared and ultraviolet radiation absorbing glass disclosed in the above-described JP-A-5-78147, the preferred range of the total iron oxide in terms of $Fe_2O_3$ is about 0.6–0.64%. In this case, a visible light transmission is at most about 71%, and thus it cannot say that the visible light transmission is sufficiently high.

The infrared and ultraviolet radiation absorbing glass disclosed in the above-described JP-A-6-56466 includes an infrared and ultraviolet radiation absorbing glass having relatively high visible light transmission. However, in order to obtain high total solar energy absorbing power, an amount of divalent iron in terms of $Fe_2O_3$ is 30–40% by weight based on the weight of the total iron in terms of $Fe_2O_3$. As a result, melting under stronger reducing condition than the general is required. Further, the total cerium in terms of $CeO_2$ is 0.5–0.8%, which is relatively large. This results in making it difficult to conduct melting under strong reducing condition, and also increases raw material cost.

DISCLOSURE OF THE INVENTION

The present invention has been made in view of the above-described problems in the prior art.

Accordingly, an object of the present invention is to provide an infrared and ultraviolet radiation absorbing glass having green tint, and in particular an infrared and ultraviolet radiation absorbing glass having high transmission and pale bluish green tint which is suitable for use as a glass for automobiles or a glass for construction.

According to the present invention, there is provided an infrared and ultraviolet radiation absorbing glass comprising, in % by weight:

a soda-lime-silica basic glass, and coloring components comprising 0.40 to less than 0.58% total iron oxide (T—$Fe_2O_3$) in terms of $Fe_2O_3$, 0.05 to less than 0.5% $CeO_2$, 0 to 0.5% $TiO_2$, and 0.0001 to 0.002% CoO, wherein 20 to less than 30% of T—$Fe_2O_3$ is FeO in terms of $Fe_2O_3$.

The content of $TiO_2$ is preferably 0 to less than 0.2%, more preferably 0 to less than 0.1%.

The infrared and ultraviolet radiation absorbing glass composition preferably further comprises 200 ppm or less of MnO.

The infrared and ultraviolet radiation absorbing glass preferably has, when the glass has a thickness of 3.25 to 6.25 mm, optical characteristics such that a visible light transmission measured with CIE standard illuminant A at a wavelength region of 380 to 770 nm is 75% or more, a dominant wavelength measured with CIE standard illuminant C at a wavelength region of 380 to 770 nm is 490 to 515 nm, a total solar energy transmission measured at a wavelength region of 300 to 2,100 nm is less than 55%, and an ultraviolet transmission defined by ISO 9050 is less than 20%.

BEST MODE FOR CARRYING OUT THE INVENTION

The reason for limitations of the glass composition of the infrared and ultraviolet radiation absorbing glass according to the present invention are described below. Unless otherwise indicated, all % are by weight.

The soda-lime-silica basic glass used herein means a general float composition, but may be a composition for thin plate in which contents of $SiO_2$, alkali oxides and alkaline earth oxides are increased or decreased to increase a coefficient of thermal expansion or Young's modulus of a glass, thereby facilitating thermal tempering, and a composition in which absorption position of coloring components is changed.

The iron oxide is present in a glass in the form of $Fe_2O_3$ and FeO. $Fe_2O_3$ is a component to enhance the ultraviolet absorbing power together with $CeO_2$ and $TiO_2$, and FeO is a component to enhance the absorption power of solar heat rays.

In order to obtain desired visible light transmission and total solar energy absorbing power, the content of the total iron oxide (T—$Fe_2O_3$) must be in a range of 0.40 to less than 0.58%, and the proportion of FeO to T—$Fe_2O_3$ (the amount of FeO is generally a value in terms of $Fe_2O_3$) must be in a range of 20 to less than 30%. If the total iron content and the proportion of FeO to T—$Fe_2O_3$ are lower than the respective lower limit of the above ranges, the total solar energy absorbing power becomes insufficient, and on the other hand, if those are higher than the respective upper limit of the above ranges, the visible light transmission becomes too low.

In order to obtain a desired ultraviolet absorbing effect in such total iron oxide content and proportion of FeO to T—$Fe_2O_3$, the $CeO_2$ content must be within a range of 0.05 to less than 0.5%. If the $CeO_2$ content is less than 0.05%, the ultraviolet absorbing effect is not sufficient, and on the other hand, if it is 0.5% or more, absorption of visible light at a short wavelength side is too large, so that a desired color tint is not obtained and also cost of raw materials increases.

$TiO_2$ is not an essential component, but can be added in an appropriate amount such that the optical characteristics intended in the present invention are not impaired, in order to increase the ultraviolet absorbing power of a glass. If the $TiO_2$ content is too large, a glass tends to color yellow. For this reason, the upper limit of the $TiO_2$ content is generally 0.5%, preferably less than 0.2%, and more preferably less than 0.1%.

CoO, although in a slight content, is an essential component, which is important to prevent the color tint from being yellowed in the case of containing iron oxide and cerium oxide together, and to adjust color tint of a glass to a preferable bluish green. The CoO content is usually 0.0001 to 0.002%.

MnO is not an essential component, but is a component effective to adjust color tint of a glass in the case of containing iron oxide and cerium oxide together, and the proportion of FeO to T—$Fe_2O_3$. If the MnO content increases, coloration by itself affects a glass. For this reason, the upper limit of the MnO content is 200 ppm.

$SnO_2$ may be added as a reducing agent to the glass having the above-described components, in an amount of up to 1%. Further, at least one of $Cr_2O_3$, NiO, $V_2O_5$, $MoO_3$ and the like may be added as a coloring agent as conventional in an amount such that the objective pale green color tint in the present invention is not impaired. The coloring agents may be added simultaneously.

EXAMPLES

The present invention is described below in more detail by the following examples, but the invention should not be limited thereto.

Soda-lime-silica basic glass composition used in the examples and the comparative examples comprises, in % by weight:
72.0% $SiO_2$,
1.61% $Al_2O_3$,
8.02% CaO,
4.05% MgO,
13.2% $Na_2O$,
0.52% $K_2O$, and
0.19% $SO_3$.

Examples 1 to 4 and Comparative Examples 1 to 3

Each of mixed raw materials comprising the above soda-lime-silica basic glass composition and coloring agents (each content is shown in % by weight) shown in Table 1 below was prepared using quartz sand, limestone, dolomite, soda ash, salt cake (sodium sulfate), ferric oxide, titanium oxide, cerium oxide, slug and carbonaceous reducing agent. The resulting mixed batch was melted in an electric furnace at 1,450° C. for 4 hours. The molten glass was cast on a stainless steel plate and annealed to room temperature to obtain glass samples each having a thickness of about 10 mm. The concentrations shown in the Tables are all wt % representation except that CoO is ppm representation.

TABLE 1

|  | Example | | | | Comparative Example | | |
|---|---|---|---|---|---|---|---|
|  | 1 | 2 | 3 | 4 | 1 | 2 | 3 |
| Total iron oxide | 0.45 | 0.50 | 0.53 | 0.57 | 0.45 | 0.53 | 0.58 |
| FeO ratio* | 25 | 25 | 25 | 22.5 | 22.5 | 25 | 22.5 |
| $CeO_2$ | 0.49 | 0.40 | 0.30 | 0.20 | 0.60 | 0.30 | 0.30 |
| $TiO_2$ | 0.03 | 0.03 | 0.05 | 0.07 | 0.03 | 0.03 | 0.05 |
| CoO | 1 | 3 | 2 | 6 | 0 | 0 | 0 |

*(FeO (in terms of $Fe_2O_3$)/total iron oxide) × 100

Each glass obtained was polished to have a thickness of about 5 mm. A visible light transmission (YA) measured with the CIE standard illuminant A, a dominant wavelength (Dw), chromaticities expressed as a and b of the Lab coordinates, an excitation purity (Pe) (measured with the CIE standard illuminant C), an ultraviolet transmission (Tuv) defined by ISO 9050, and a total solar energy transmission (TG) were measured as optical characteristics of each glass.

Optical characteristics of the glass samples obtained are shown in Table 2 below.

TABLE 2

|  | Example | | | | Comparative Example | | |
|---|---|---|---|---|---|---|---|
|  | 1 | 2 | 3 | 4 | 1 | 2 | 3 |
| YA | 79.5 | 77.3 | 76.9 | 75.2 | 79.3 | 77.6 | 77.2 |
| TG | 54.9 | 53.3 | 52.0 | 51.7 | 58.3 | 52.3 | 52.3 |
| Tuv | 19.8 | 19.2 | 18.6 | 17.9 | 16.1 | 18.6 | 16.6 |
| Dw | 496 | 495 | 496 | 496 | 504 | 498 | 502 |
| Pe | 2.80 | 3.38 | 3.32 | 3.48 | 1.82 | 3.00 | 2.45 |
| a | −5.83 | −6.47 | −6.84 | −6.85 | −5.55 | −6.64 | −6.95 |
| b | −0.08 | −0.39 | −0.08 | −0.25 | 1.10 | 0.32 | 1.18 |

As is apparent from Table 2 above, the glass samples obtained in the Examples have optical characteristics that a visible light transmission (YA) measured with the CIE standard illuminant A is 75% or higher, an ultraviolet transmission (Tuv) defined by ISO 9050 is less than 20%, and a total solar energy transmission (TG) is less than 55%. Further, in view of the facts that the dominant wavelength (Dw) measured with the CIE standard illuminant C is around 495 nm, and the chromaticity expressed as b of the Lab coordinates is minus, it is apparent that the glass samples obtained in the Examples are a glass having a bluish green tint which is a favorable color tint as glasses for automobiles, and the like.

Contrary to this, the glass samples obtained in the Comparative Examples have optical characteristics that a dominant wavelength measured with the CIE standard illuminant C is about 498 to 504 nm, and the chromaticity expressed as b of the Lab coordinates is plus. This shows that differing from the glasses obtained in the Examples, those glasses have yellowish green tint which is not a favorable color tint as glasses for automobiles, and the like.

Industrial Applicability

As described in detail above, the present invention can produce the infrared and ultraviolet radiation absorbing glass having appropriate solar heat absorbing power and ultraviolet absorbing power while maintaining high visible light transmission without coloring in dark green.

Further, the infrared and ultraviolet radiation absorbing glass according to the present invention maintains pale green color tint and high visible light transmission, and therefore is particularly useful in the case that a pale color tint is favorable, or as glasses for automobiles or glasses for construction, that are used after application of a coating film.

What is claimed is:

1. An infrared and ultraviolet radiation absorbing glass comprising, in % by weight:
    a soda-lime-silica basic glass, and
    coloring components consisting of
        0.40 to less than 0.58% total iron oxide (T—$Fe_2O_3$) in terms of $Fe_2O_3$,
        0.05 to less than 0.5% $CeO_2$,
        0 to 0.5% $TiO_2$, and
        0.0001 to 0.002% CoO,
    wherein 20 to less than 30% of T—$Fe_2O_3$ is FeO in terms of $Fe_2O_3$, and further wherein the glass has, when the glass has a thickness of 3.25 to 6.25 mm, a visible light transmission determined with CIE standard illuminant A of 75% or more.

2. The infrared and ultraviolet radiation absorbing glass as claimed in claim 1, wherein the content of $TiO_2$ is 0 to less than 0.2%.

3. The infrared and ultraviolet radiation absorbing glass as claimed in claim 1, wherein the content of $TiO_2$ is 0 to less than 0.1%.

4. The infrared and ultraviolet radiation absorbing glass as claimed in claim 1, wherein the glass has, when the glass has a thickness of 3.25 to 6.25 mm, an ultraviolet transmission defined by ISO 9050 of less than 20%.

5. The infrared and ultraviolet radiation absorbing glass as claimed in claim 1, wherein the glass has, when the glass has a thickness of 3.25 to 6.25 mm, a total solar energy transmission of less than 55%.

6. The infrared and ultraviolet radiation absorbing glass as claimed in claim 1, wherein the glass has, when the glass has a thickness of 3.25 to 6.25 mm, a dominant wavelength determined with CIE standard illuminant C at a wavelength region of 490 to 515 nm.

7. The infrared and ultraviolet radiation absorbing glass as claimed in claim 6, wherein the dominant wavelength is 490 to 496 nm.

8. An infrared and ultraviolet radiation absorbing glass comprising, in % by weight:
    a soda-lime-silica basic glass, and
    coloring components consisting of
        0.40 to less than 0.58% total iron oxide (T—$Fe_2O_3$) in terms of $Fe_2O_3$,
        0.05 to less than 0.5% $CeO_2$,
        0 to 0.5% $TiO_2$,
        0.0001 to 0.002% CoO, and
        200 ppm or less MnO;
    wherein 20 to less than 30% of T—$Fe_2O_3$ is FeO in terms of $Fe_2O_3$, and further wherein the glass has, when the glass has a thickness of 3.25 to 6.25 mm, a visible light transmission determined with CIE standard illuminant A of 75% or more.

9. The infrared and ultraviolet radiation absorbing glass as claimed in claim 8, wherein the glass has, when the glass has a thickness of 3.25 to 6.25 mm, an ultraviolet transmission defined by ISO 9050 of less than 20%.

10. The infrared and ultraviolet radiation absorbing glass as claimed in claim 8, wherein the glass has, when the glass has a thickness of 3.25 to 6.25 mm, a total solar energy transmission of less than 55%.

11. The infrared and ultraviolet radiation absorbing glass as claimed in claim 8, wherein the glass has, when the glass has a thickness of 3.25 to 6.25 mm, a dominant wavelength determined with CIE standard illuminant C at a wavelength region of 490 to 515 nm.

12. The infrared and ultraviolet radiation absorbing glass as claimed in claim 11, wherein the dominant wavelength is 490 to 496 nm.

* * * * *